United States Patent
Cleaver et al.

(10) Patent No.: US 10,986,686 B2
(45) Date of Patent: Apr. 20, 2021

(54) OFFLINE DEVICE MANAGEMENT

(71) Applicant: International Business Machines Corporation, Armonk, NY (US)

(72) Inventors: James David Cleaver, Grose Wold (AU); Michael James McGuire, Sydney (AU); Malwina Bajsarowicz, Miloszyce (PL); Maria Virginia Williams, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/508,342

(22) Filed: Jul. 11, 2019

(65) Prior Publication Data
US 2021/0014921 A1 Jan. 14, 2021

(51) Int. Cl.
| | |
|---|---|
| *H04W 76/19* | (2018.01) |
| *H04W 4/80* | (2018.01) |
| *H04W 8/00* | (2009.01) |
| *G06F 8/65* | (2018.01) |
| *H04W 8/24* | (2009.01) |
| *H04W 4/70* | (2018.01) |

(52) U.S. Cl.
CPC .............. *H04W 76/19* (2018.02); *G06F 8/65* (2013.01); *H04W 4/70* (2018.02); *H04W 4/80* (2018.02); *H04W 8/005* (2013.01); *H04W 8/245* (2013.01)

(58) Field of Classification Search
CPC ......... H04W 76/19; H04W 4/70; H04W 4/80; H04W 8/005; H04W 8/245; G06F 8/65
See application file for complete search history.

(56) References Cited

U.S. PATENT DOCUMENTS

| | | | |
|---|---|---|---|
| 6,944,662 B2 | 9/2005 | Devine et al. | |
| 7,254,608 B2 | 8/2007 | Yeager et al. | |
| 7,574,481 B2 | 8/2009 | Moore et al. | |
| 8,316,364 B2 | 11/2012 | Stein | |
| 9,854,445 B1 * | 12/2017 | Gu | H04L 67/18 |
| 2008/0130639 A1 | 6/2008 | Costa-Requena et al. | |
| 2011/0106886 A1 | 5/2011 | Nolterieke et al. | |
| 2011/0289383 A1 | 11/2011 | Dhuse et al. | |

(Continued)

OTHER PUBLICATIONS

Starbooks ("Starbooks Offline", The first Philippine Science Digital Library, printed Apr. 12, 2019, 1 page, (c) 2015. DOST-STII Starbooks, http://www.starbooks.ph/) (Year: 2019).*

(Continued)

*Primary Examiner* — Chi H Pham
*Assistant Examiner* — Ji-Hae Yea
(74) *Attorney, Agent, or Firm* — Stosch Sabo (57) ABSTRACT

Described herein are techniques for transmitting data to an offline Internet of Things (IoT) device using a transient device. The techniques including a method comprising receiving, at a transient device in a first location that is communicatively coupled to a base station by a first network at a first time, a first portion of a plurality of portions of data for delivery to an offline IoT device. The method further including connecting the transient device in a second location to the offline IoT device using a short-range network at a second time after the first time. The method further including transferring the first portion of the plurality of portions of data from the transient device to the offline IoT device using the short-range network.

20 Claims, 5 Drawing Sheets

(56) References Cited

U.S. PATENT DOCUMENTS

| | | | |
|---|---|---|---|
| 2014/0149846 A1 | 5/2014 | Ansel et al. | |
| 2014/0207844 A1 | 7/2014 | Mayo et al. | |
| 2015/0286475 A1* | 10/2015 | Vangelov | G06F 8/71 |
| | | | 717/170 |
| 2015/0363210 A1* | 12/2015 | Wehrman | G06F 8/65 |
| | | | 701/31.5 |
| 2016/0021149 A1* | 1/2016 | Maistri | H04L 65/80 |
| | | | 348/14.08 |
| 2016/0299753 A1 | 10/2016 | Tseng | |
| 2017/0105104 A1* | 4/2017 | Ulmansky | H04W 4/90 |
| 2018/0158093 A1* | 6/2018 | Szirtes | G06Q 30/0269 |
| 2018/0376519 A1* | 12/2018 | Duncan | H04W 12/08 |
| 2019/0102164 A1* | 4/2019 | Gur | G06F 8/71 |
| | | | 717/170 |
| 2019/0110174 A1* | 4/2019 | Way | G06F 8/65 |
| | | | 701/31.5 |

OTHER PUBLICATIONS

Starbooks, "Starbooks Offline", The first Philippine Science Digital Library, printed Apr. 12, 2019, 1 page, © 2015. DOST-STII Starbooks, http://www.starbooks.ph/.

Ordman, R., "Efficient over-the-air software and firmware updates for the Internet of Things", Embedded Computing Design, Apr. 1, 2014, 5 pages.

Sampaio et al., "Incremental Updates on Mobile Datawarehousing Using Optimized Hierarchical Views and New Aggregation Operators", 17th International Conference on Advanced Information Networking and Applications, Mar. 29, 2003, 6 pages.

Wikipedia, "Fog computing", From Wikipedia, the free encyclopedia, last edited on Jun. 15, 2019, 5 pages.

* cited by examiner

OFFLINE DEVICE MANAGEMENT

BACKGROUND

The present disclosure relates to offline devices, and, more specifically, to providing data to, and collecting data from, offline devices.

The Internet of Things (IoT) extends Internet connectivity into electronic devices such as consumer electronics, sensors, and embedded systems. IoT devices are typically configured to retain network connectivity with a base station (or one another) in order to share data. However, some IoT devices lack network connectivity due to their placement relative to network access points and network range capabilities. For example, IoT devices for providing content to, or collecting data from, remote, rural, and/or underdeveloped areas can have limited or no network connectivity. In these situations, the IoT devices can be referred to as offline IoT devices insofar as they lack constant (or even intermittent) network connectivity with one another or with a base station. In such situations, it is challenging to maintain software on the offline IoT devices, provide content to the offline IoT devices, and/or collect data from the offline IoT devices.

SUMMARY

Aspects of the present disclosure are directed toward a computer-implemented method comprising receiving, at a transient device in a first location that is communicatively coupled to a base station by a first network at a first time, a first portion of a plurality of portions of data for delivery to an offline Internet of Things (IoT) device. The method further comprises connecting the transient device in a second location to the offline IoT device using a short-range network at a second time after the first time. The method further comprises transferring the first portion of the plurality of portions of data from the transient device to the offline IoT device using the short-range network.

Additional aspects of the present disclosure are directed to systems and computer program products configured to perform the methods described above.

Further aspects of the present disclosure are directed to a system comprising an autonomous vehicle having a processor and a computer-readable storage medium storing program instructions, a first data set received at a first time from a base station using a first network, and a second data set received at a second time from an offline Internet of Things (IoT) device using a short-range network. The processor is configured to execute the program instructions to cause the processor to transfer, at one location, the first data set to the offline IoT device using the short-range network at a third time, and to transfer, at another location, the second data set to the base station using the first network at a fourth time.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward offline devices, and, more specifically, to providing data to, and collecting data from, offline devices. While not limited to such applications, embodiments of the present disclosure may be better understood in light of the aforementioned context.

Aspects of the present disclosure utilize a transient (e.g., mobile, moving, migrant, portable, roving, ambulatory, etc.) electronic device to exchange data between a base station and an offline Internet of Things (IoT) device, where the base station and the offline IoT device are not communicatively coupled to one another. The transient device can exchange data such as, for example, educational content, software updates, firmware updates, user-generated data, sensor data, and the like. In various embodiments, the transient device can be an autonomous vehicle, a user device, or a different device capable of movement (whether by its own power or as a result of being carried by a person). In some embodiments, the transient device follows a preconfigured route designed to intersect a network associated with the base station and another network associated with the offline IoT device. In other embodiments, the transient device is predicted to follow a future route that intersects a network associated with the base station and another network associated with the offline IoT device as a result of typical, random, or incidental movement of the transient device.

Thus, aspects of the present disclosure are directed to utilizing a transient device as a communication bridge for exchanging information between a base station and an offline IoT device where the offline IoT device has limited or no network connectivity to the base station, where the exchanged data is not time-sensitive, and/or where the exchanged data can be partitioned into feasibly small segments for transmission by a transient device. Advantageously, aspects of the present disclosure can create a communication bridge using a transient device rather than necessitating upgraded networking technology on the offline IoT device or expanded networking infrastructure surrounding the offline IoT device. Furthermore, aspects of the present disclosure can realize the communication bridge incidentally by utilizing transient devices that have opted into the communication bridge program (e.g., a citizen-scientist program whereby citizens employ their smart devices as a mechanism for collecting data from, and providing updated content to, one or more offline IoT devices).

Thus, the capabilities and advantages provided by the present disclosure can be incorporated into a variety of fields for numerous purposes. For example, the present disclosure is applicable to applications as diverse as collecting inventory data from vending machines, providing educational content to learning kiosks, collecting measurement data from atmospheric, oceanic, terrestrial, agricultural, or other sensors, providing traffic, construction, and/or weather updates on road signage, and/or providing advertising content on electronic billboards to name a select few. In the aforementioned examples, each of the vending machines, learning kiosks, sensors, road signs, and/or electronic billboards may have limited or no network connectivity as a result of their remote location or location in an underdeveloped area lacking accessible network connectivity.

Figure 1:
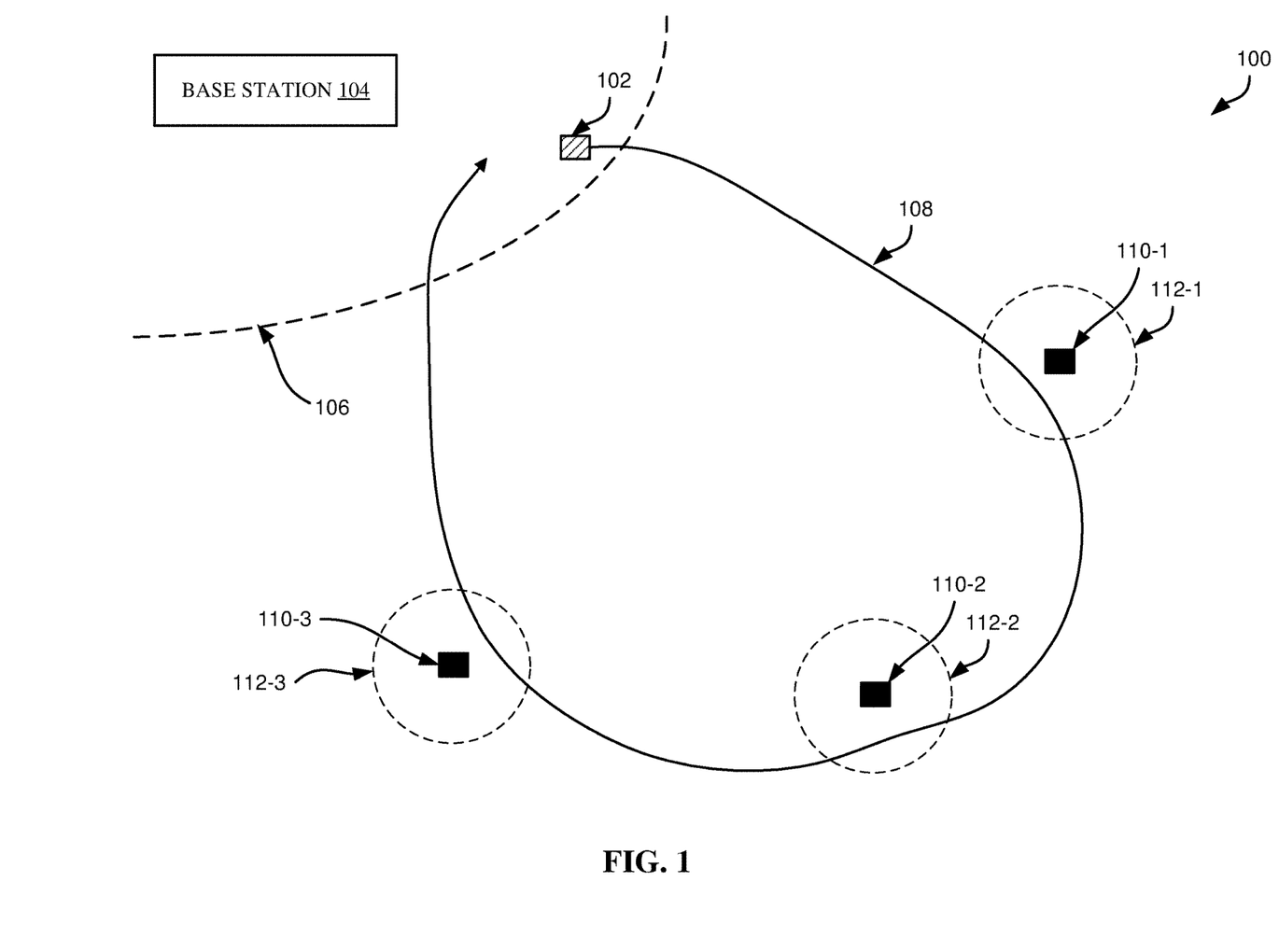
FIG. 1 illustrates a diagram of an example geographic area illustrating a transient device interacting with one or more offline Internet of Things (IoT) devices and a base station, in accordance with embodiments of the present disclosure.

Referring now to FIG. 1, illustrated is a diagram of an example geographic region 100, in accordance with embodiments of the present disclosure. Geographic region 100 can include transient device 102, base station 104, and offline Internet of Things (IoT) devices 110-1, 110-2, and 110-3 (generically or collectively referred to as offline IoT devices 110).

Transient device 102 is an electronic device moving along path 108. Transient device 102 is capable of networking with other devices using various types of networks. For example, transient device 102 can communicate with base station 104 using a first network 106 such as a wide area network (WAN), a local area network (LAN), a cellular network, a short-range network, the Internet, or the like. Likewise, transient device 102 can communicate with offline IoT devices 110 using short-range networks 112-1, 112-2, and/or 112-3 (generically or collectively referred to as short-range networks 112). Short-range networks 112 can include, but are not limited to, networks utilizing Institute of Electrical and Electronics Engineers (IEEE) 802.15 standards, IEEE 1902.1 standards, personal area networks (PAN), Bluetooth™ networks, Near Field Communication (NFC) networks, Infrared Data Association (IrDA) networks, Internet Protocol version 6 (IPv6) over Low-Power Wireless Personal Area Networks (6LoWPAN), DASH7 Alliance Protocol (D7A) networks, RuBee networks, Ultra-wideband (UWB) networks, Frequency Modulation (FM)-UWB networks, Wireless Ad Hoc Networks (WANET), Z-Wave networks, ZigBee™ networks, and other short-range networks, communication protocols, and the like. Notably, offline IoT devices 110 are unable to directly communicate with base station 104 as shown by the non-overlapping boundaries of first network 106 and short-range networks 112.

Transient device 102 can communicate with base station 104 using first network 106 at the beginning of path 108. For example, transient device 102 can upload information to base station 104 and/or download information from base station 104. As transient device 102 proceeds along path 108, transient device 102 intersects a first short-range network 112-1 associated with a first offline IoT device 110-1. While intersecting the first short-range network 112-1, the transient device can upload information to, or download information from, first offline IoT device 110-1 using the first short-range network 112-1. As one example, the transient device 102 can upload content to first offline IoT device 110-1 (e.g., a portion of content, an update, a portion of an update, and the like). As another example, the transient device 102 can download information from first offline IoT device 110-1 such as data collected from sensors associated with the first offline IoT device 110-1 or user feedback collected from a user interface associated with the first offline IoT device 110-1.

Similarly, transient device 102 can interact with a second offline IoT device 110-2 using a second short range network 112-2 and a third offline IoT device 110-3 using a third short-range network 112-3. The number of offline IoT devices 110 is shown for illustrative purposes and in some embodiments fewer (e.g., one) offline IoT device 110 are present, whereas in other embodiments many more (e.g., tens, hundreds, etc.) offline IoT devices 110 are present.

At the end of path 108, transient device 102 can again communicate with base station 104 using first network 106. Transient device 102 can, for example, upload data to base station 104 that was collected from one or more offline IoT devices 110. As another example, transient device 102 can upload a confirmation to base station 104 that certain data was successfully provided to one or more offline IoT devices 110.

As can be seen from FIG. 1, transient device 102 can be used as a communication bridge between a base station 104 and an offline IoT device 110 where the base station 104 and the offline IoT device 110 are not directly communicatively coupled to one another. Using transient device 102 as a communication bridge can be useful for providing content to offline IoT devices 110 such as, for example, software updates, firmware updates, educational material, informational material, and the like. Using transient device 102 as a communication bridge can also be useful for collecting data from offline IoT devices 110 such as, for example, sensor data, user input data, and the like.

Transient device 102 can be, but is not limited to, an autonomous, semi-autonomous, remote, or manned vehicle such as an aerial vehicle (e.g., a drone, a plane, a balloon, a dirigible, a rocket, etc.), a submersible vehicle (e.g., a boat, a ship, a submarine, etc.), and/or a land vehicle (e.g., an automobile, a robotic assembly for land navigation, etc.). In other embodiments, transient device 102 includes an electronic device carried by, or attached to, a person. In these embodiments, the transient device 102 can include, but is not limited to, a cell phone, mobile phone, smartphone, tablet, laptop, smartwatch, smart glasses, or another electronic device.

Transient device 102 can move along path 108 by its own direction (e.g., autonomously), based on received signals (e.g., remotely), and/or incidentally (e.g., carried by a person). In some embodiments, transient device 102 includes instructions to dwell within a short-range network 112 in order to complete an upload or download with an offline IoT device 110. In some embodiments, transient device 102 is selected for exchanging data between base station 104 and offline IoT devices 110 based on a variety of factors such as, but not limited to, a previous route used by the transient device 102, a predicted route of the transient device 102, a planned route of the transient device 102, or other factors.

Base station 104 can be a managing device for offline IoT devices 110. For example, base station 104 can maintain offline IoT devices 110 (e.g., by providing software updates, firmware updates, new content, and the like) to offline IoT devices 110. Base station 104 can also compile data collected from offline IoT devices 110. In some embodiments, base station 104 shown in FIG. 1 illustrates a network access point providing access to base station 104 (e.g., the location of base station 104 shown in FIG. 1 may be a location where the transient device 102 has Internet access and can communicate with base station 104 despite base station 104 being physically located hundreds or thousands of miles away).

Offline IoT devices 110 can include, but are not limited to, kiosks configured for user interaction (e.g., educational kiosks presenting educational content, financial kiosks such as Automated Teller Machines (ATMs), vending machines, and the like), air measurement devices (e.g., devices for measuring atmospheric conditions, climatic conditions, temperature, humidity, pressure, visibility, precipitation, wind, etc.), soil measurement devices (e.g., devices for measuring seismic activity, moisture content, erosion, acidity, mineral-content, etc.), water measurement devices (e.g., devices for measuring flowrate, currents, temperature, acidity, oxygen content, light, etc.), other measurement devices, road signage, electronic billboard signage, and/or other devices that may benefit from network connectivity for maintenance or data collection but lack network connectivity.

Figure 2A:
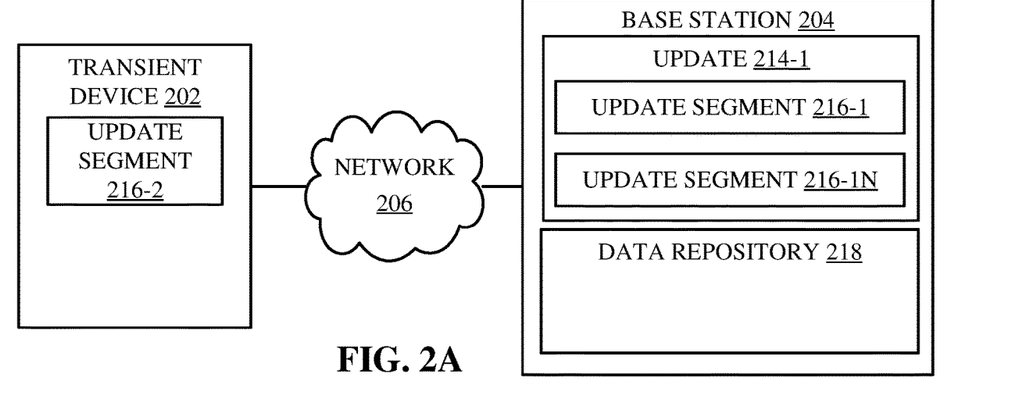
FIG. 2A illustrates a block diagram of a transient device interfacing with a base station to download a portion of an update for an offline IoT device, in accordance with embodiments of the present disclosure.
Figure 2B:
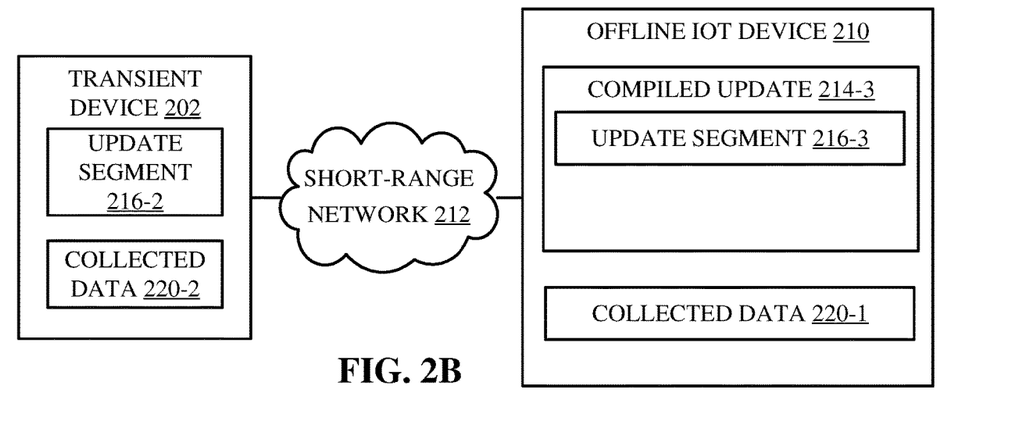
FIG. 2B illustrates a block diagram of a transient device interfacing with an offline IoT device for uploading a portion of an update to the offline IoT device and/or downloading collected data from the IoT device, in accordance with embodiments of the present disclosure.
Figure 2C:
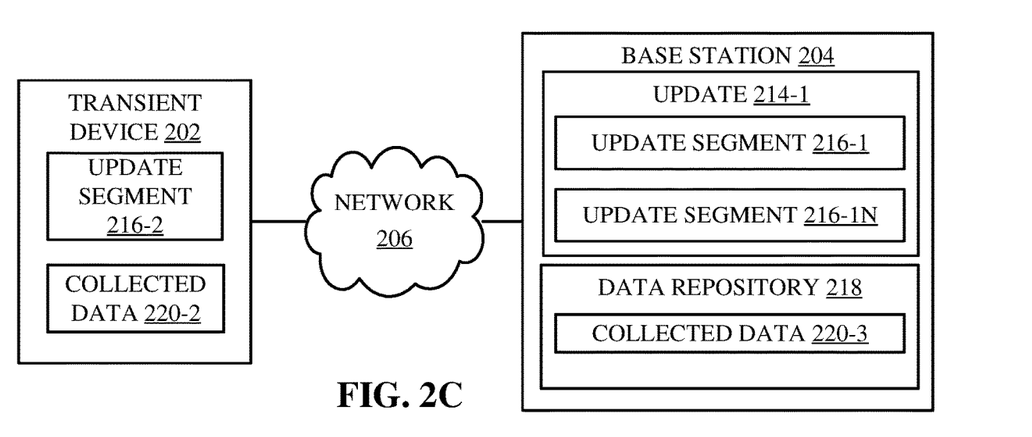
FIG. 2C illustrates a block diagram of a transient device interfacing with a base station to upload collected data from an offline IoT device, in accordance with embodiments of the present disclosure.

Referring now to FIGS. 2A-2C, illustrated are various interactions between transient device 202 and base station 204 using network 206, and between transient device 202 and offline IoT device 210 using short-range network 212. In some embodiments, transient device 202, base station 204, network 206, offline IoT device 210, and short-range network 212 are consistent with transient device 102, base station 104, network 106, offline IoT device 110, and/or short-range network 112 of FIG. 1, respectively.

Referring now to FIG. 2A, illustrated is a block diagram of transient device 202 receiving content from a base station 204 for an offline IoT device 210 at a first time and in a first location, in accordance with embodiments of the present disclosure. Base station 204 can contain an update 214-1 such as a software update, a firmware update, or a content update. The update 214-1 can be partitioned into a number of segments such as update segment 216-1 through update segment 216-1N, where N is a variable integer representing the update 214-1 partitioned into any number of segments. Base station 204 can also include a data repository 218 for storing data such as data collected from an offline IoT device 210. In some embodiments, a portion of update 214-1 is copied to transient device 202 using network 206. As shown in FIG. 2A, update segment 216-2 in transient device 202 is a copied version of update segment 216-1 stored in base station 204. Although not explicitly shown, in some embodiments, an index associated with the update 214-1 indicating information about each of the update segments 216-1 through 216-1N is also copied to the transient device 202.

Referring now to FIG. 2B, illustrated is a block diagram of transient device 202 providing content to, and receiving content from, an offline IoT device 210 at a second time after the first time and in a second location different from the first location, in accordance with embodiments of the present disclosure. As shown in FIG. 2B, transient device 202 can provide update segment 216-2 to offline IoT device 210 using short-range network 212 to cause offline IoT device 210 to store update segment 216-3 in a partially compiled update 214-3. In some embodiments, transient device 202 also provides an index related to the update 214-1 to the offline IoT device 210 (not shown).

As can also be seen in FIG. 2B, offline IoT device 210 can provide collected data 220-1 to transient device 202 via short-range network 212 so that transient device 202 stores collected data 220-2 in transient device 202. Collected data 220-1 can refer to data such as, but not limited to, sensor data, user-input data, user-generated data, and the like. Although not explicitly shown, in some embodiments, offline IoT device 210 also provides an index summarizing collected data 220-1 to transient device 202. This can be done in situations where collected data 220-1 is partitioned and segments of collected data 220-1 are provided to base station 104 over a period of time and using multiple transient device 202 or a same transient device 202 multiple times.

Referring now to FIG. 2C, illustrated is a block diagram of transient device 202 providing content from offline IoT device 210 to base station 204 using network 206 at a third time after the second time and in a third location that is different from the second location (in some embodiments, the third location is similar to the first location). As shown in FIG. 2C, transient device 202 can upload collected data 220-2 to base station 204 using network 206 so that base station 204 stores collected data 220-3 in data repository 218.

Although FIGS. 2A-2C show transient device 202 simultaneously providing content to offline IoT device 210 (e.g., update segment 216-3) and retrieving content from offline IoT device 210 (e.g., collected data 220-2), embodiments exist where only one of these operations occur. For example, transient device 202 can be used to only provide content to offline IoT device 210. As another example, transient device 202 can be used to only collect data from offline IoT device 210.

Figure 3A:
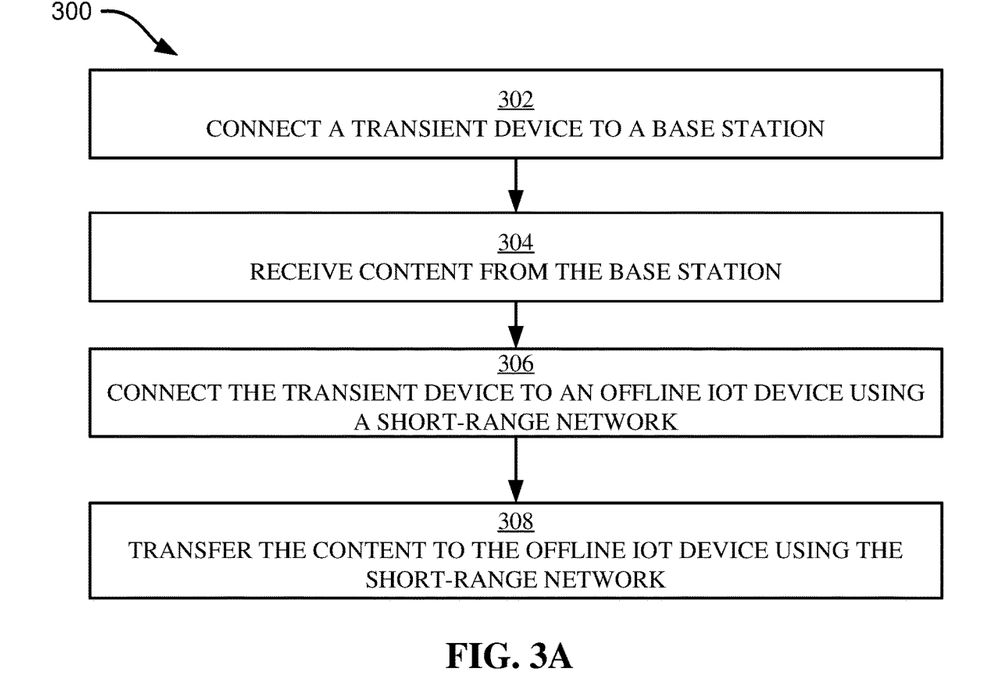
FIG. 3A illustrates a flowchart of an example method for providing content from a base station to an offline IoT device using a transient device, in accordance with embodiments of the present disclosure.

Referring now to FIG. 3A, illustrated is a flowchart of an example method 300 for providing content to an offline IoT device using a transient device, in accordance with embodiments of the present disclosure. In some embodiments, the method 300 is implemented by a transient device (e.g., transient device 102 of FIG. 1 or 202 of FIGS. 2A-2C), or by a different configuration of hardware and/or software.

Operation 302 includes connecting the transient device to a base station using a first network, such as the Internet, a WAN, a LAN, a cellular network, a hardwired connection, or a different network. In operation 302, the transient device connects to the base station at a first location and a first time. The first location being located in an area where an offline IoT device lacks network communication with the base station and the transient device at the first time.

Operation 304 includes receiving content from the base station to the transient device, where the content is for transmission to the offline IoT device. In some embodiments, one or more portions of the content are stored in the transient device. In some embodiments, an index associated with the content (and any partitioned portions of the content) is also stored in the transient device. In some embodiments, the content received at the transient device includes a computer-generated signature indicating the integrity, authenticity, and/or validity of the content.

Operation 306 includes connecting the transient device to the offline IoT device using a short-range network at a second time after the first time and at a second location different from the first location. In some embodiments, neither the transient device nor the offline IoT device are in communication with the base station at the second location at the second time.

Operation 308 includes transferring the content from the transient device to the offline IoT device using the short-range network. In some embodiments, one or more portions of the content are transferred from the transient device to the offline IoT device in embodiments where the content is partitioned. In embodiments including an index, the index summarizing the partitioned content and how different portions of the partitioned content relate to one another is also provided to the offline IoT device from the transient device.

Figure 3B:
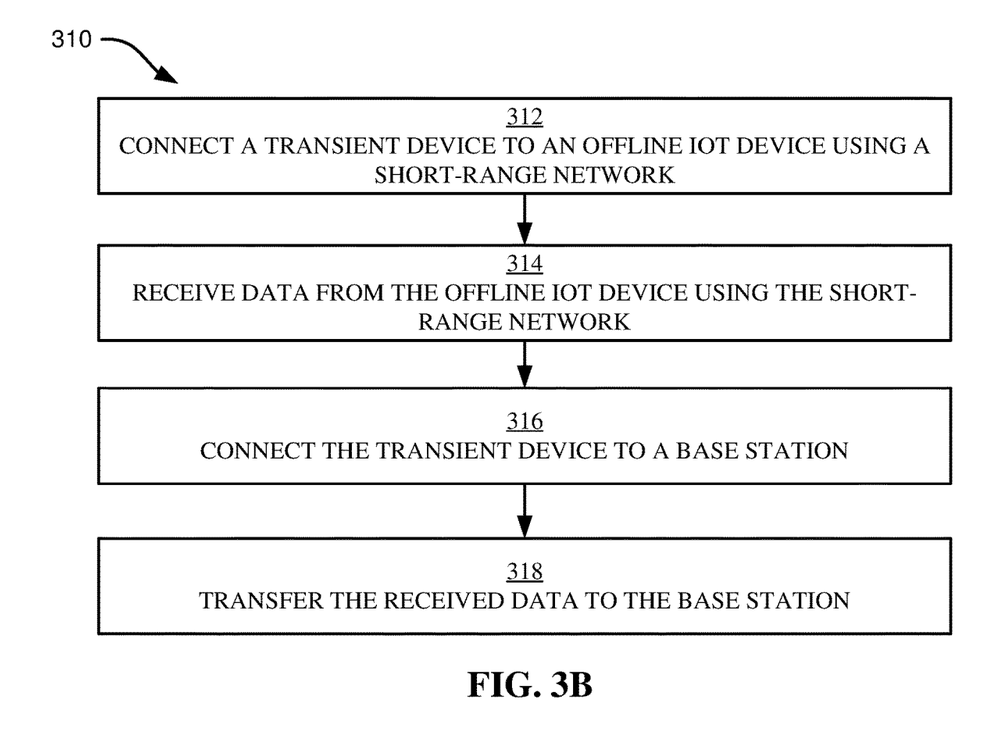
FIG. 3B illustrates a flowchart of an example method for providing data collected from an offline IoT device to a base station using a transient device, in accordance with embodiments of the present disclosure.

Referring now to FIG. 3B, illustrated is a flowchart of an example method 310 for transmitting data from an offline IoT device to a base station using a transient device, in accordance with embodiments of the present disclosure. In some embodiments, the method 310 is implemented by a transient device (e.g., transient device 102 of FIG. 1 or 202 of FIGS. 2A-2C), or by a different configuration of hardware and/or software. In various embodiments, the method 310 can be performed together with the method 300. In such embodiments, the method 300 can occur prior to the method 310, whereas in other embodiments, the method 300 occurs after the method 310.

Operation 312 includes connecting a transient device to an offline IoT device using a short-range network at a first time and in a first location. Operation 314 includes receiving data at the transient device and from the offline IoT device using the short-range network. In some embodiments, the data is a portion of a partitioned data set. In some embodiments, operation 314 includes receiving an index associated with the partitioned data set.

Operation 316 includes connecting the transient device to a base station at a second time and in a second location, where the base station lacks network connectivity to the offline IoT device. Operation 318 includes transferring the data received from the offline IoT device to the base station and from the transient device. In embodiments including an index, operation 318 further includes transferring the index to the base station.

Figure 4A:
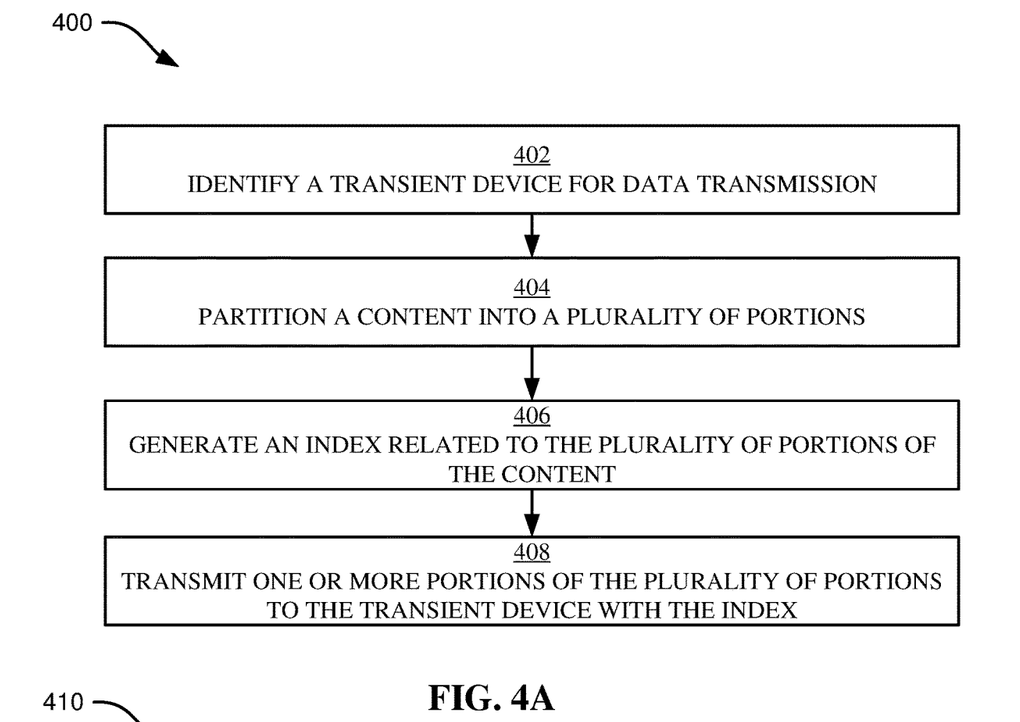
FIG. 4A illustrates a flowchart of an example method for partitioning data for transmission using a transient device, in accordance with embodiments of the present disclosure.

Referring now to FIG. 4A, illustrated is a flowchart of an example method 400 for partitioning data for transmission using a transient device. The method 400 can be performed by, for example, a base station (e.g., base station 104 of FIG. 1 or 204 of FIG. 2), an offline IoT device (e.g., offline IoT device 110 of FIG. 1 or 210 of FIG. 2) or a different configuration of hardware and/or software.

Operation 402 includes identifying a transient device to use for data transmission. Identifying the transient device can include detecting a transient device within a vicinity of the offline IoT device or base station, selecting a transient device from numerous transient devices stored in a data repository of known transient devices, and the like. In some embodiments, a transient device is identified based on a prediction that the transient device has a probability above a threshold of passing within a distance threshold of a predetermined location (e.g., a location of an offline IoT device, a location of a base station, a location of a wireless access point, an effective range of a short-range network, etc.). In such embodiments, the probability of the route of the transient device can be determined by, for example, analyzing historical location data associated with the transient device (e.g., a logfile of global positioning system (GPS) coordinates). In other embodiments, the transient device can be determined to pass within a threshold distance of a predetermined location based on a manifest associated with the transient device (e.g., a planned flight of a drone, etc.).

Operation 404 includes partitioning data into a plurality of portions. The plurality of portions can be of equal size or similar size. When similarly sized, the plurality of portions can be sized according to a content-based separator, such as a chapter, a lesson, a presentation, a date the data was collected, and the like. The content can be related to educational content, informational content, software updates, firmware updates, sensor data, photographic data, video data, audio data, user-generated data (e.g., feedback, reviews, test scores, usage data, etc.), user-consumable data, and the like.

Operation 406 includes generating an index related to the plurality of portions, where the index includes at least an indicator for each of the plurality of portions. In some embodiments, the index further includes data related to each of the plurality of portions, such as, for example, a size of each of the plurality of portions, a timestamp related to when each of the portions was created or last updated, a sequence identifier of each portion indicating its location within the plurality of portions, and the like.

Operation 408 includes transmitting one or more portions of the plurality of portions to the transient device for future transmission to an offline IoT device or a base station. In some embodiments, operation 406 further includes transmitting the index to the transient device.

Although not explicitly shown in the method 400, in some embodiments, the method 400 further includes an encryption operation, a signing operation, or another operation useful for securing the data or otherwise marking the data to indicate the integrity, authenticity, and/or validity of the data. In these embodiments, the signing operation can be useful for making the data verifiable to a receiving device so that the receiving device can authenticate, validate, or otherwise confirm the integrity, accuracy, and/or security of the data.

Figure 4B:
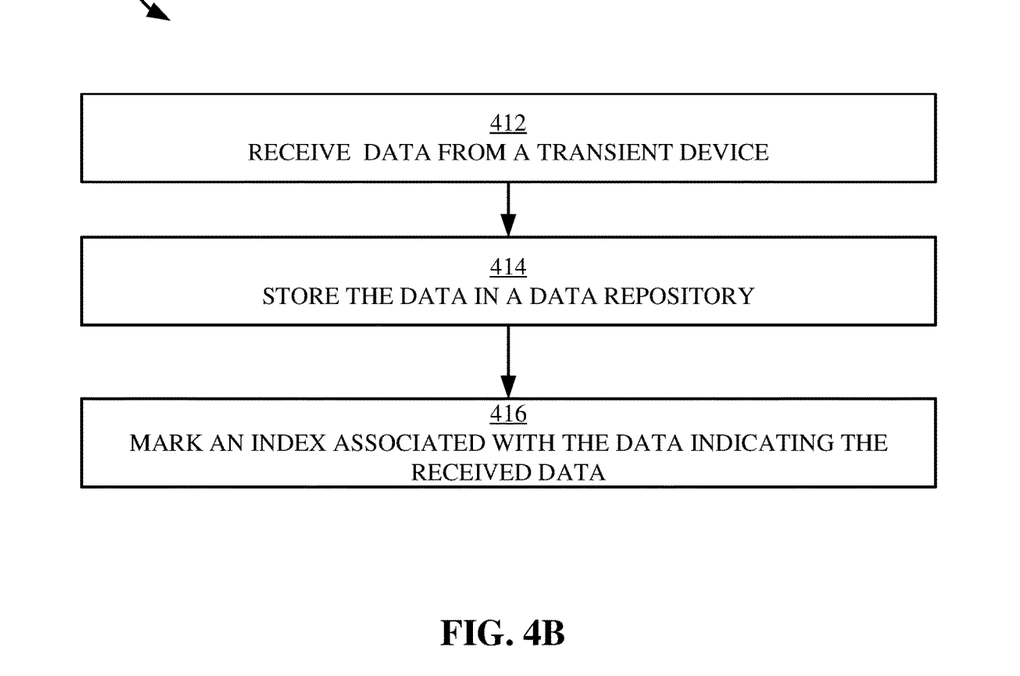
FIG. 4B illustrates a flowchart of an example method for storing partitioned data received from a transient device, in accordance with embodiments of the present disclosure.

Referring now to FIG. 4B, illustrated is a flowchart of an example method 410 for receiving data from a transient device. The method 410 can be performed by, for example, a base station (e.g., base station 104 of FIG. 1 or 204 of FIG. 2), an offline IoT device (e.g., offline IoT device 110 of FIG. 1 or 210 of FIG. 2), or a different configuration of hardware and/or software.

Operation 412 includes receiving data from a transient device. In some embodiments, the data belongs to partitioned data and one or more portions of the partitioned data are received. In such embodiments, an index related to the partitioned data can also be received.

Operation 414 includes storing the received data in a data repository of the base station or the offline IoT device. In embodiments where the received data is partitioned data, operation 414 can include organizing, compiling, or otherwise aggregating data as it relates to the original data set. For example, if the received data is a portion of a software update, it can be stored or executed according to its relationship to the other received portions of the software update. As another example, if the received data is sensor data from a time period, it can be chronologically arranged amongst other sensor data from other time periods.

Operation 416 includes marking an index associated with the received data indicating which of the partitioned data is received so that each received portion of the partitioned data includes an indication in the index recording that the received portion is accounted for by the offline IoT device or the base station. Operation 416 can be useful for determining when an entire set of data is received so that, for example, a compiled update can be executed, an aggregated data set can be analyzed, a completed lesson can be presented, and the like.

Figure 5:
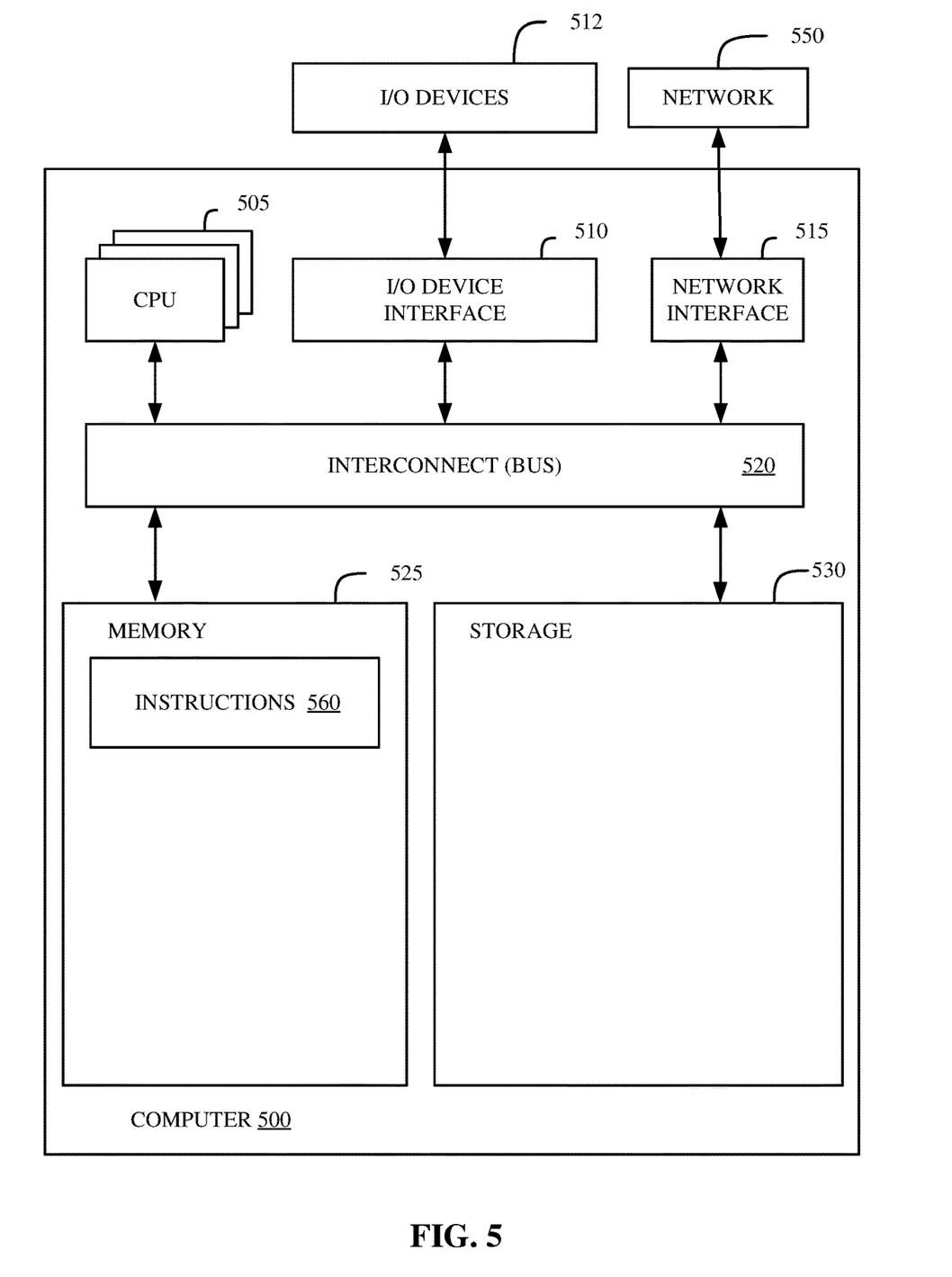
FIG. 5 illustrates a block diagram of an example computer, in accordance with embodiments of the present disclosure.

FIG. 5 illustrates a block diagram of an example computer 500 in accordance with some embodiments of the present disclosure. In various embodiments, computer 500 can perform the methods described in FIGS. 3-4 and/or implement the functionality discussed in FIGS. 1 and 2A-2C. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into one or more of a transient device (e.g., transient device 102 of FIG. 1 or 202 of FIG. 2), a base station (e.g., base station 104 of FIG. 1 or 204 of FIG. 2), and/or an offline IoT device (e.g., offline IoT device 110 of FIG. 1 or 210 of FIG. 2).

Computer 500 includes memory 525, storage 530, interconnect 520 (e.g., BUS), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more busses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be processor-executable instructions for performing any portion of, or all of, any of the methods of FIGS. 3-4 and/or implementing any of the functionality discussed in FIGS. 1 and 2A-2C.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any subset of the methods described with respect to FIGS. 3-4 and/or any of the functionality discussed in FIGS. 1 and 2A-2C) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
receiving, at a transient device in a first location that is communicatively coupled to a base station by a first network at a first time, a first portion of a plurality of portions of data for delivery to an offline Internet of Things (IoT) device and an index related to the plurality of portions of data, wherein the index includes an indication of each of the plurality of portions, a size of each of the plurality of portions, and a sequence of the plurality of portions;
connecting the transient device in a second location to the offline IoT device using a short-range network at a second time after the first time; and
transferring the first portion of the plurality of portions of data and the index from the transient device to the offline IoT device using the short-range network.

2. The method of claim 1, wherein the plurality of portions of data comprise a partitioned software update.

3. The method of claim 1, wherein the plurality of portions of data comprise a partitioned educational content.

4. The method of claim 1, wherein the first portion includes a signature that is verifiable to the offline IoT device.

5. The method of claim 1, further comprising:
receiving collected data at the transient device from the offline IoT device using the short-range network; and
transferring, from the transient device and to the base station at a third time after the second time, the collected data from the offline IoT device using the first network.

6. The method of claim 1, wherein the transient device is selected based on a prediction that the transient device has a probability above a threshold of passing within a predetermined distance of the offline IoT device, wherein the predetermined distance is based on an effective range of the short-range network.

7. The method of claim 1, wherein the short-range network comprises a personal area network (PAN).

8. The method of claim 1, wherein the transient device comprises an autonomous vehicle.

9. The method of claim 1, wherein the transient device is selected from a group consisting of: a smartphone, a tablet, and a smartwatch.

10. A computer program product comprising a non-transitory computer readable storage medium having program instructions embodied therewith, the program instructions executable by a processor to cause the processor to perform a method comprising:
receiving, at a transient device in a first location that is communicatively coupled to a base station by a first network at a first time, a first portion of a plurality of portions of data for delivery to an offline Internet of Things (IoT) device and an index related to the plurality of portions of data, wherein the index includes an indication of each of the plurality of portions, a size of each of the plurality of portions, and a sequence of the plurality of portions;
connecting the transient device in a second location to the offline IoT device using a short-range network at a second time after the first time; and
transferring the first portion of the plurality of portions of data and the index from the transient device to the offline IoT device using the short-range network.

11. The computer program product of claim 10, wherein the first portion includes a signature that is verifiable to the offline IoT device.

12. The computer program product of claim 10, further comprising:
receiving collected data at the transient device from the offline IoT device using the short-range network; and
transferring, from the transient device and to the base station at a third time after the second time, the collected data from the offline IoT device using the first network.

13. The computer program product of claim 10, wherein the transient device is selected based on a prediction that the transient device has a probability above a threshold of passing within a predetermined distance of the offline IoT device, wherein the predetermined distance is based on an effective range of the short-range network.

14. The computer program product of claim 10, wherein the short-range network comprises a Near Field Communication (NFC) network.

15. The computer program product of claim 10, wherein the transient device comprises an autonomous vehicle.

16. The computer program product of claim 10, wherein the transient device is selected from a group consisting of: a smartphone, a tablet, and a smartwatch.

17. A system comprising:
an autonomous vehicle having a processor and a non-transitory computer-readable storage medium storing program instructions, a first data set received at a first time from a base station using a first network, wherein the first data set includes an index related to a plurality of portions of data in the first data set, wherein the index includes an indication of each of the plurality of portions, a size of each of the plurality of portions, and a sequence of the plurality of portions, and a second data set received at a second time at from an offline Internet of Things (IoT) device using a short-range network, wherein the processor is configured to execute the program instructions to cause the processor to:
transfer, at one location, the first data set to the offline IoT device using the short-range network at a third time; and
transfer, at another location, the second data set to the base station using the first network at a fourth time.

18. The system of claim 17, wherein the first data set comprises updated user-consumable content, wherein the second data set comprises user-generated feedback data.

19. The method of claim 2, wherein the offline IoT device is configured to use the index to verify that each of the plurality of portions of the partitioned software update is received at the offline IoT device based on respective indications and respective sizes of the plurality of portions, order the plurality of portions according to the sequence into a software update, and execute the software update.

20. The method of claim 5, wherein the collected data further includes a second index associated with the collected data, wherein the second index includes respective indications of each portion of the collected data and a timestamp related to each portion of the collected data indicating when each portion was collected, and wherein the base station is configured to confirm each portion of the collected data is received and order the collected data according to the respective timestamps.

* * * * *